(12) United States Patent
Ogawa et al.

(10) Patent No.: US 11,137,211 B2
(45) Date of Patent: Oct. 5, 2021

(54) HEAT EXCHANGER (71) Applicant: DENSO CORPORATION, Kariya (JP)

(72) Inventors: Hiroshi Ogawa, Kariya (JP); Mitsuharu Inagaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/571,935

(22) Filed: Sep. 16, 2019

(65) Prior Publication Data
US 2020/0011604 A1 Jan. 9, 2020

Related U.S. Application Data (63) Continuation of application No. PCT/JP2018/004462, filed on Feb. 8, 2018.

(30) Foreign Application Priority Data

Mar. 21, 2017 (JP) .............................. JP2017-054675

(51) Int. Cl.
*F28F 9/00* (2006.01)
*F28F 9/02* (2006.01)
(Continued)

(52) U.S. Cl.
CPC ....... *F28D 1/0233* (2013.01); *F28D 1/05316* (2013.01); *F28F 1/14* (2013.01); *F28F 1/325* (2013.01)

(58) Field of Classification Search
CPC ...... F28F 2275/04; F28F 9/001; F28F 9/0219; F28F 9/0224; F28F 2265/14; F28F 2265/26; F28D 1/053; F28D 1/0516
(Continued)

(56) References Cited

U.S. PATENT DOCUMENTS 5,492,172 A * 2/1996 Laveran ................ F28F 9/0224
165/173
5,842,515 A * 12/1998 Kim ....................... B21D 53/02
165/175
(Continued)

FOREIGN PATENT DOCUMENTS

DE 19800943 A1 8/1998
DE 102006042936 A1 3/2008
(Continued)

*Primary Examiner* — Frantz F Jules
*Assistant Examiner* — Jason N Thompson
(74) *Attorney, Agent, or Firm* — Harness, Dickey & Pierce, P.L.C.

(57) ABSTRACT

A first connection portion is located on one side of a predetermined flow path member in a plane direction. The predetermined flow path member and another flow path member are bonded by brazing at the first connection portion. A second connection portion is located on the other side of the predetermined flow path member. The predetermined flow path member and another flow path member are bonded by brazing at the second connection portion. A brazing material layer extends over the predetermined flow path member, the first connection portion, and the second connection portion. A hilling portion is a portion of the predetermined flow path member. The hilling portion is curved to protrude toward a side on which the brazing material layer is provided. The hilling portion extends along a direction in which the first connection portion or the second connection portion extends.

5 Claims, 9 Drawing Sheets (51) Int. Cl.
  *F28D 1/053* (2006.01)
  *F28D 1/02* (2006.01)
  *F28F 1/32* (2006.01)
  *F28F 1/14* (2006.01)

(58) Field of Classification Search
  USPC .......................................................... 165/173
  See application file for complete search history.

(56) References Cited

U.S. PATENT DOCUMENTS

| | | | |
|---|---|---|---|
| 5,868,198 A | 2/1999 | Kato | |
| 6,082,439 A * | 7/2000 | Kato | F28F 9/0226 |
| | | | 165/173 |
| 7,201,218 B2 * | 4/2007 | Hiyama | F28F 9/0224 |
| | | | 165/173 |
| 7,543,471 B2 * | 6/2009 | Birkert | F28D 7/16 |
| | | | 72/370.22 |
| 2001/0054496 A1 * | 12/2001 | Kajikawa | F28F 21/084 |
| | | | 165/133 |
| 2002/0057941 A1 * | 5/2002 | Nakajima | F28F 9/0224 |
| | | | 403/230 |
| 2004/0050540 A1 | 3/2004 | Kato et al. | |
| 2016/0377357 A1 * | 12/2016 | Riondet | F28F 1/02 |
| | | | 165/173 |

FOREIGN PATENT DOCUMENTS

| | | |
|---|---|---|
| JP | 2002213896 A | 7/2002 |
| JP | 2007125590 A | 5/2007 |
| JP | 2009041799 A | 2/2009 |
| JP | 2009180468 A | 8/2009 |
| JP | 2014181845 A | 9/2014 |
| JP | 5893450 B2 | 3/2016 |
| JP | 2016145662 A | 8/2016 |
| JP | 2017106661 A | 6/2017 |

* cited by examiner

HEAT EXCHANGER

CROSS REFERENCE TO RELATED APPLICATION

The present application is a continuation application of International Patent Application No. PCT/JP2018/004462 filed on Feb. 8, 2018, which designated the U.S. and claims the benefit of priority from Japanese Patent Application No. 2017-054675 filed on Mar. 21, 2017. The entire disclosures of all of the above applications are incorporated herein by reference.

TECHNICAL FIELD

The present disclosure relates to a heat exchanger.

BACKGROUND

A conventional heat exchanger includes two header tanks facing each other, a plurality of tubes communicatively connecting the two header tanks, outer fins provided outside the plurality of tubes, inner fins provided inside the plurality of tubes, and others. Each of flow path members constituting a flow path through which fluid flows in the heat exchanger, such as the header tanks and the tubes described above, is produced during a manufacturing process from a brazing sheet which includes a base material chiefly made of aluminum, and a brazing material joined to a surface of the base material by pressure joining. The respective flow path members are temporarily assembled, heated in a heating furnace, and joined to each other by brazing.

SUMMARY

According to an aspect of the present disclosure, a heat exchanger that performs heat exchange of fluid includes: flow path members defining a flow path through which the fluid flows; a first connection portion located on a first side of a predetermined flow path member in a plane direction of the predetermined flow path member, the predetermined flow path member and another flow path member being bonded to each other by brazing; a second connection portion located on a second side of the predetermined flow path member in the plane direction, the predetermined flow path member and another flow path member being bonded to each other by brazing; a brazing material layer extending over the predetermined member, the first connection portion, and the second connection portion; and a hilling portion that is a portion of the predetermined flow path member located between the first connection portion and the second connection portion, the hilling portion being curved to protrude toward a side on which the brazing material layer is provided, the hilling portion extending along a direction in which the first connection portion or the second connection portion extends.

EMBODIMENTS

Firstly, a comparative example of the present disclosure will be described. Shortage of connection portion strengths between tank members and header members may be produced when the brazing material inside the header tanks flows toward the tubes, and forms smaller fillets at the connection portions of the tank members and the header members during brazing between the flow path members of the heat exchanger. Moreover, performance of the heat exchanger may drop when the brazing material inside the header tanks flows into the tubes and closes flow paths inside the tubes.

For overcoming these points, in the comparative example, each flow path members is formed such that a radius of curvature of a fillet made of brazing material and provided at each of connection portions of inner walls of tubes and inner fins becomes equal to or smaller than a radius of curvature of a fillet made of brazing material and provided at each of connection portions of tank members and header members. The brazing material is heated and melted into a liquid film shape during brazing between the flow path members of the heat exchanger. According to the comparative example, Laplace pressure of the brazing material at the connection portions between the inner walls of the tubes and the inner fins becomes equal to or higher than Laplace pressure of the brazing material at the connection portions between the tank members and the header members during brazing. The brazing material heated and melted into a liquid film shape characteristically flows from a higher Laplace pressure side to a lower Laplace pressure side. Accordingly, a flow of the brazing material from the inside of the header tanks toward the tubes decreases. In the following description, Laplace pressure is abbreviated as pressure.

However, the heat exchanger of the comparative example imposes design limitations on the shape of the connection portions between the tank members and the header members, the inner dimension of the tubes, the shape of the inner fins, and others. Accordingly, a technology which reduces a flow of the brazing material without considerably changing the shapes of the flow path members of the heat exchanger has been demanded.

In the manufacturing step of the heat exchanger, it is preferable that not only reduction of a flow of the brazing material from the header tanks into the tubes as described above, but also reduction of a flow of the brazing material in other flow path members be achievable. This reduction can prevent shortage of strength of a connection portion at a predetermined flow path member constituting the heat exchanger on one side in a plane direction, and further prevent an excess of the brazing material on a connection portion provided on the other side.

Embodiments according to the present disclosure are hereinafter described with reference to the drawings. In the respective embodiments described herein, identical or equivalent parts are given identical reference numbers.

First Embodiment

A first embodiment will be described with reference to the drawings. For example, a heat exchanger of the present embodiment is applied to a condenser, an evaporator, or others constituting a not-shown refrigeration cycle mounted on a vehicle. This type of heat exchanger is capable of exchanging heat between air and a refrigerant circulating in the refrigeration cycle.

Figure 1:
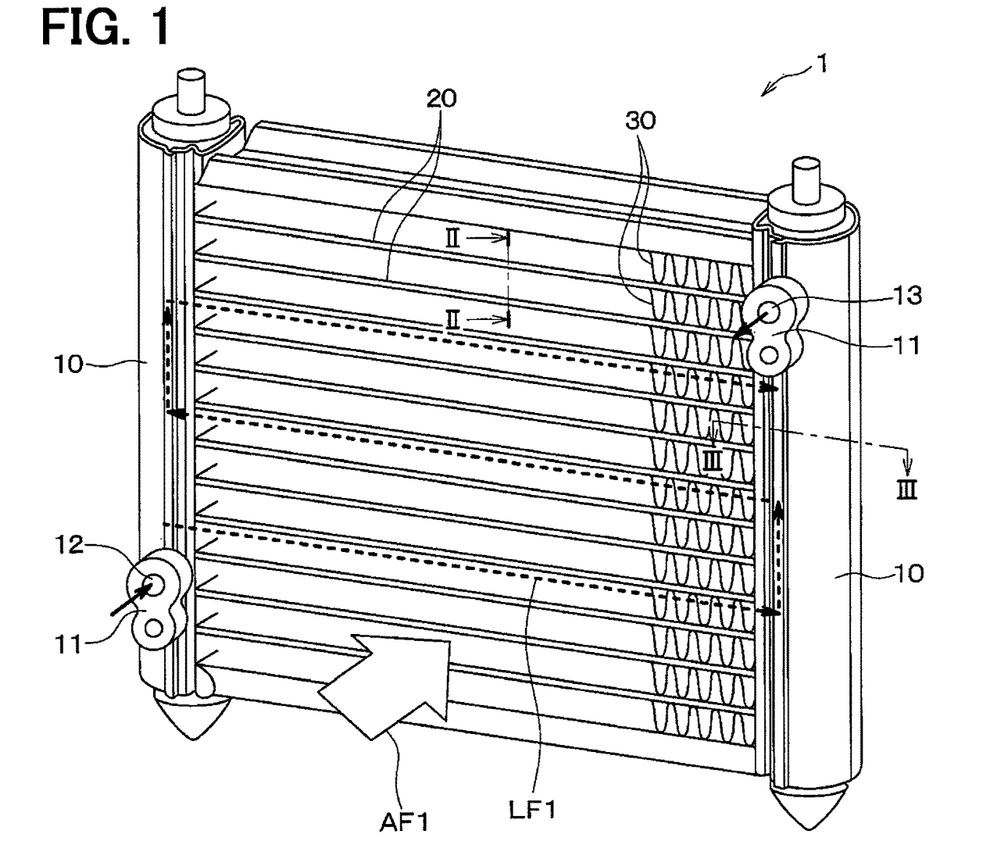
FIG. 1 is a perspective view of a heat exchanger according to a first embodiment.
Figure 2:
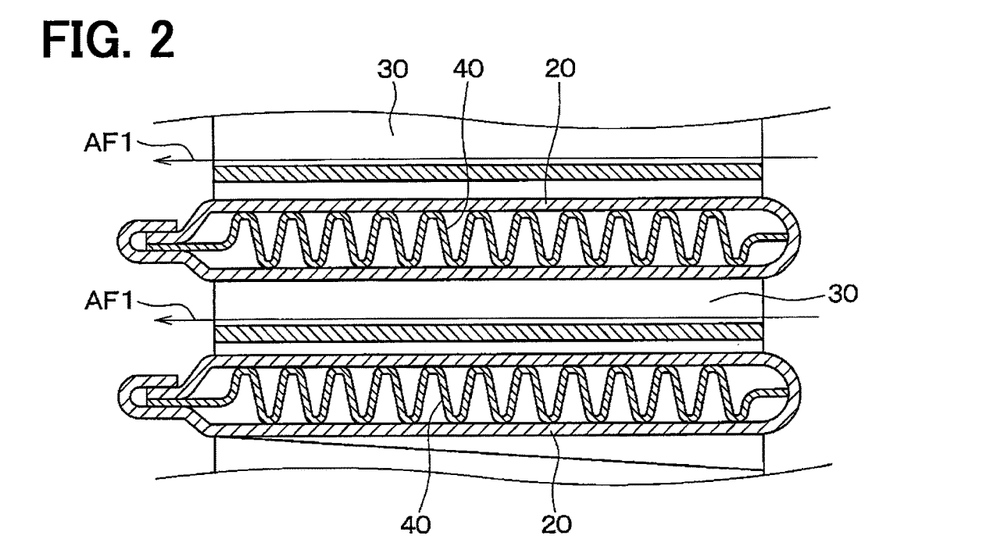
FIG. 2 is a cross-sectional view taken along a line II-II in FIG. 1.

As shown in FIGS. 1 and 2, a heat exchanger 1 includes two header tanks 10, a plurality of tubes 20, outer fins 30, inner fins 40, and others. The plurality of tubes 20 communicatively connect the two header tanks 10. The outer fins 30 are provided outside the plurality of tubes 20. The inner fins 40 are provided inside the plurality of tubes 20. All these members are flow path members forming a flow path through which fluid flows. For example, these members are produced from a brazing sheet which includes a base material made of aluminum, and a brazing material joined to a surface of the base material by pressure joining during a manufacturing process.

Each of the two header tanks 10 is formed into a columnar shape, and disposed in parallel to and away from each other. Each of the two header tanks 10 includes a connection portion 11 to which piping of a refrigeration cycle is connected. One of the joints 11 has an inlet 12 to which a refrigerant is supplied from piping of the refrigeration cycle. The other joint 11 has an outlet 13 from which the refrigerant flows out toward the piping of the refrigeration cycle. A not-shown separator is provided inside each of the two header tanks 10 to divide an internal space in an axial direction. Accordingly, as indicated by a broken line LF1 with arrows in FIG. 1, the refrigerant supplied from the inlet 12 to one of the header tanks 10 flows through the corresponding header tank 10 and the plurality of tubes 20, and then flows out from the outlet 13 formed in the other header tank 10.

The plurality of tubes 20 are laminated between the one header tank 10 and the other header tank 10, and communicatively connect the one header tank 10 and the other header tank 10. As shown in FIG. 2, each of the tubes 20 is produced by bending the brazing sheet into a tubular shape having a flat cross section. A flow path through which a refrigerant flows is formed inside each of the tubes 20. The inner fin 40 is provided inside each of the tubes 20. The inner fin 40 is a corrugated fin formed by bending a thin metal plate alternately toward one side and the other side in a plate thickness direction, and is fixed to an inner wall of the tube 20 by brazing. A connection portion between the inner wall of the tube 20 and the inner fin 40 joins the tube 20 and the inner fin 40 such that the tube 20 and the inner fin 40 form an acute angle.

As shown in FIG. 1, the outer fins 30 are provided between the plurality of tubes 20. Each of the outer fins 30 is a corrugated fin produced by alternately bending a thin metal plate toward one side and the other side in the plate thickness direction, and is fixed to an outer wall of the tube 20 by brazing. FIG. 1 does not show a part of the outer fins 30 on the left side in the figure. An arrow AF1 in each of FIGS. 1 and 2 indicates a flow direction of air which passes through the outer fins 30.

Figure 3:
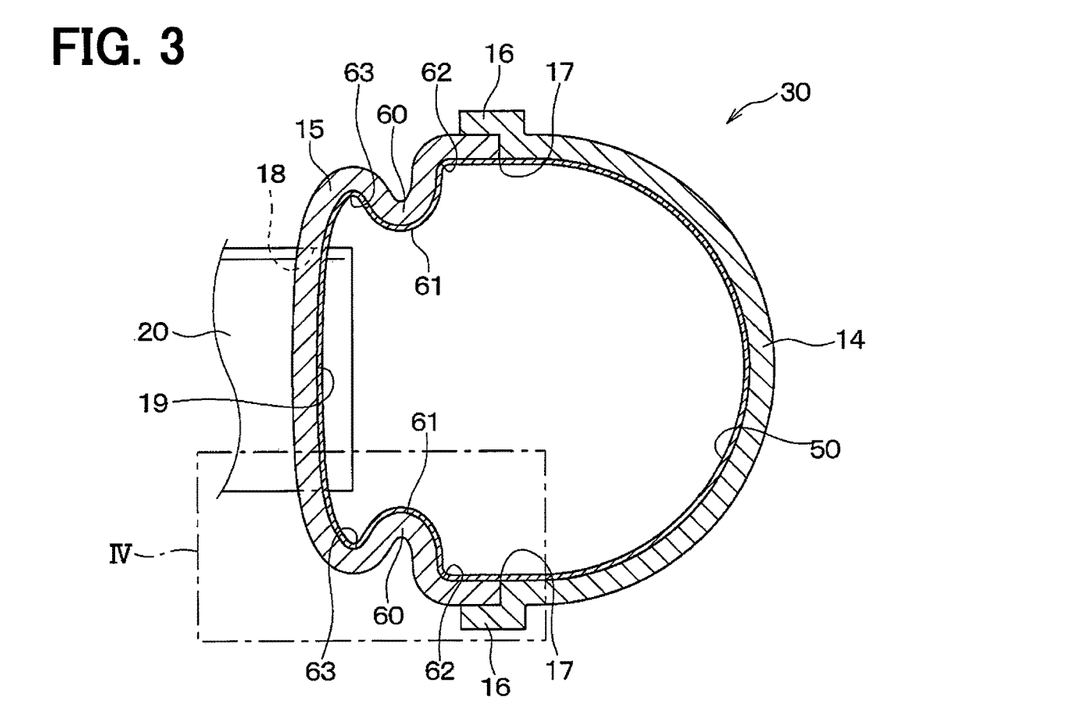
FIG. 3 is a cross-sectional view taken along a line III-Ill in FIG. 1.

As shown in FIG. 3, the header tank 10 is constituted by a tank member 14 and a header member 15. The tank member 14 has a substantially U-shaped cross section. The tank member 14 has fitting portions 16 at both ends of the U-shape. Each of the fitting portions 16 has a crank shape bent outward in a radial direction of a flow path of the header tank 10. Each of the fitting portions 16 covers the outside of an end of the header member 15, and is joined to the end of the header member 15 by brazing. The tank member 14 and the header member 15 are joined to each other with substantially no step, or only a small step produced on an inner circumferential surface of the header tank 10. According to the present embodiment, a connection portion between the tank member 14 and the header member 15 is referred to as a first connection portion 17. The connection portion between the tank member 14 and the header member 15 (i.e., first connection portion 17) is not required to have the shape described above, but may have various shapes.

The header member 15 has holes 18 into which the plurality of tubes 20 are inserted. The plurality of tubes 20 are inserted into the holes 18 of the header member 15, and fixed to the holes 18 by brazing. The inner circumferential surface of the header member 15 and each of the tubes 20 are joined to each other at a right angle or at an angle close to a right angle. According to the present embodiment, each of connection portions between the header member 15 and the tubes 20 is referred to as a second connection portion 19. Each of the connection portions between the header member 15 and the tubes 20 (i.e., second connection portion 19) is not similarly required to have the shape described above, but may have various shapes.

A brazing material layer 50 is provided on the inner circumferential surface of the header tank 10. As described above, members such as the tank member 14, the header member 15, and the tubes 20 are produced from the brazing sheet in the manufacturing process. In the manufacturing process of the heat exchanger 1, the flow path members are temporarily assembled and heated to a temperature higher than a melting point of the brazing material in a heating furnace. Thereafter, the flow path members are brazed and fixed to each other by solidification of the brazing material. The brazing material layer 50 is produced by melting and then solidifying the brazing material of the brazing sheet. The brazing material layer 50 extends over the header tank 10, the first connection portion 17, and the second connection portion 19. Each of FIGS. 3 and 4 shows a larger thickness of the brazing material layer 50 than an actual thickness for easy understanding of the description.

During brazing of the heat exchanger 1 in the heating furnace, brazing material of the brazing sheet may be melted and flow on the surface of the base material. In this case, the brazing material heated and melted into a liquid film shape tends to flow from a connection portion where a large angle is formed by two flow path members, toward a connection portion where a small angle is formed by two flow path members. This tendency is caused by a pressure change of the brazing material heated and melted into a liquid film shape in accordance with curvature of a liquid surface of the brazing material. In case of the brazing material heated and melted into a liquid film shape in the present embodiment, pressure of the brazing material at the second connection portion 19 between the inner wall of the tube 20 and the inner fin 40 is lower than pressure of the brazing material at the first connection portion 17 between the tank member 14 and the header member 15. It is therefore considered that the brazing material flows from the first connection portion 17 between the tank member 14 and the header member 15 to the second connection portion 19 between the inner wall of the tube 20 and the inner fin 40. It is further considered that the brazing material flows from the first connection portion 17 between the tank member 14 and the header member 15 while sucked toward the connection portion formed between the inner wall of the tube 20 and the inner fin 40 and disposed inside the tube 20.

Figure 4:
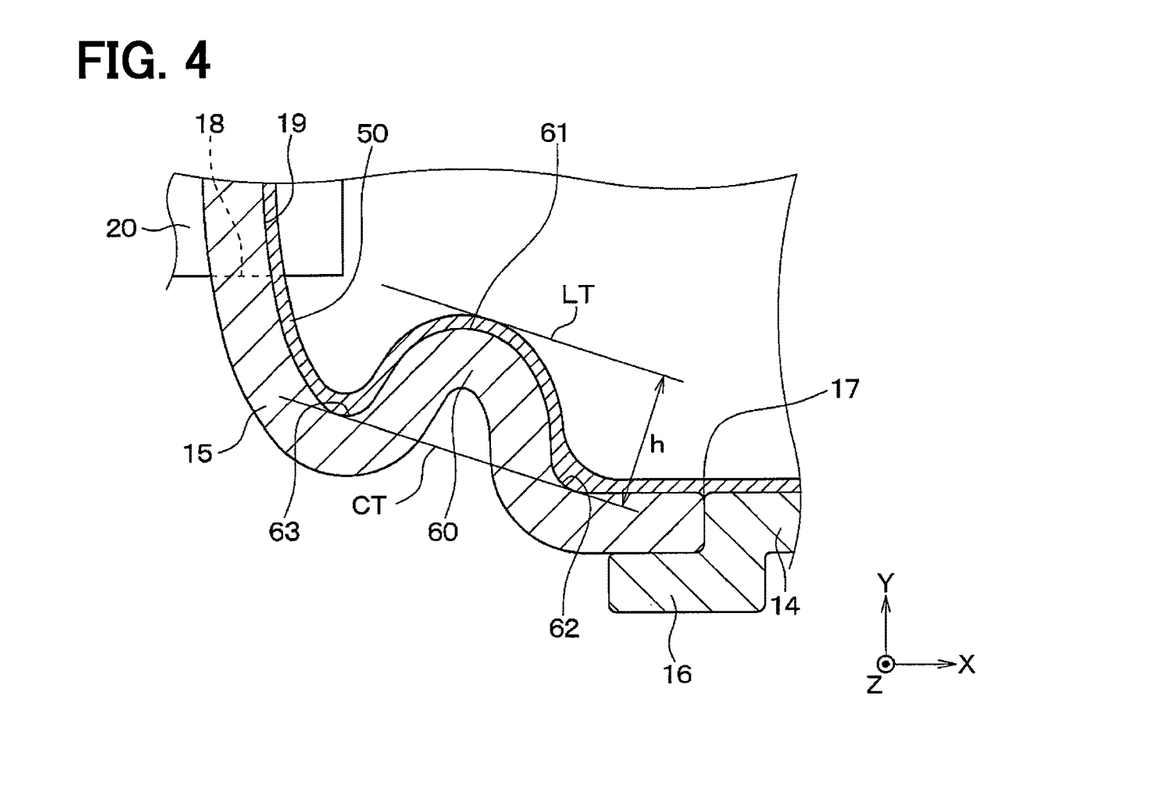
FIG. 4 is an enlarged view of a portion IV in FIG. 3.

According to the present embodiment, hilling portions 60 are provided on the header member 15 as shown in FIG. 3 and FIG. 4. Each of the hilling portions 60 is a portion included in the header member 15 and located between the first connection portion 17 and the second connection portion 19, and curved to protrude toward the side where the brazing material is provided. Each of the hilling portions 60 extends in an extension direction of the first connection portion 17 which joins the tank member 14 and the header member 15 (i.e., direction perpendicular to sheet surfaces of FIGS. 3 and 4). According to the present embodiment, the header member 15 including the hilling portions 60 is an example of "a predetermined flow path member" described in one aspect and others of the present disclosure. Each of the tank member 14 and the tube 20 is an example of "another flow path member" described in the one aspect or others of the present disclosure. Another flow path member constituting the first connection portion, and another flow path member constituting the second connection portion may be identical to each other, or may be different from each other.

More specifically, each of the hilling portions 60 has a connection portion 61, a first concave 62, and a second concave 63. The connection portion 61 is a portion formed on a top of the hilling portion 60, and has a cross section protruded with respect to the side where the brazing material is provided (i.e., positive curvature). The first concave 62 is a portion formed in a base of the hilling portion 60 near the first connection portion 17. The second concave 63 is a portion formed in a base of the hilling portion 60 near the second connection portion 19. Each of the first concave 62 and the second concave 63 has a cross section recessed with respect to the side where the brazing material is provided (i.e., negative curvature).

In the present specification, a height h of the hilling portion 60 is defined as follows. As shown in FIG. 3, the height h of the hilling portion 60 is a distance between a common tangent line CT of an interface between the brazing material layer and the base material at the first concave 62 and an interface between the brazing material layer and the base material at the second concave 63, and a line LT extending in parallel to the common tangent line CT and coming into contact with an outer surface of the brazing material layer of the connection portion 61 in a cross-sectional view of the hilling portion 60.

According to the present embodiment, the hilling portions 60 are provided on the header member 15. Accordingly, when the brazing material is heated and melted into a liquid film shape during brazing of the heat exchanger 1 in the heating furnace, pressure of the brazing material on the surface of the connection portion 61 of the hilling portion 60 becomes higher than pressure of the brazing material at the first concave 62 and the second concave 63. Moreover, pressure of the brazing material on the surface of the connection portion 61 of the hilling portion 60 becomes higher than pressure of the brazing material on the surface of the header member 15 around the connection portion 61. As a result, the brazing material of the connection portion 61 of the hilling portion 60 easily flows toward the area around the connection portion 61. In other words, flow resistance of the brazing material flowing across the hilling portion 60 on the surface of the header member 15 increases during brazing. Accordingly, the flow of the brazing material across the hilling portion 60 from the first connection portion 17 to the second connection portion 19 on the surface of the header member 15 decreases during brazing. The heat exchanger 1 therefore can prevent shortage of connection portion strength caused by reduction of the fillet of the first connection portion 17, and further prevent an excess of the brazing material on the second connection portion 19. The heat exchanger 1 can also prevent suction of the brazing material from the inside of the header tank 10 into the tube 20, thereby preventing closure of the flow path inside the tube 20 by the sucked brazing material during brazing.

A result of an experiment executed by the present inventor to check a flow reduction effect of the brazing material in accordance with curvature and height of the hilling portions will be next described.

Figure 5:
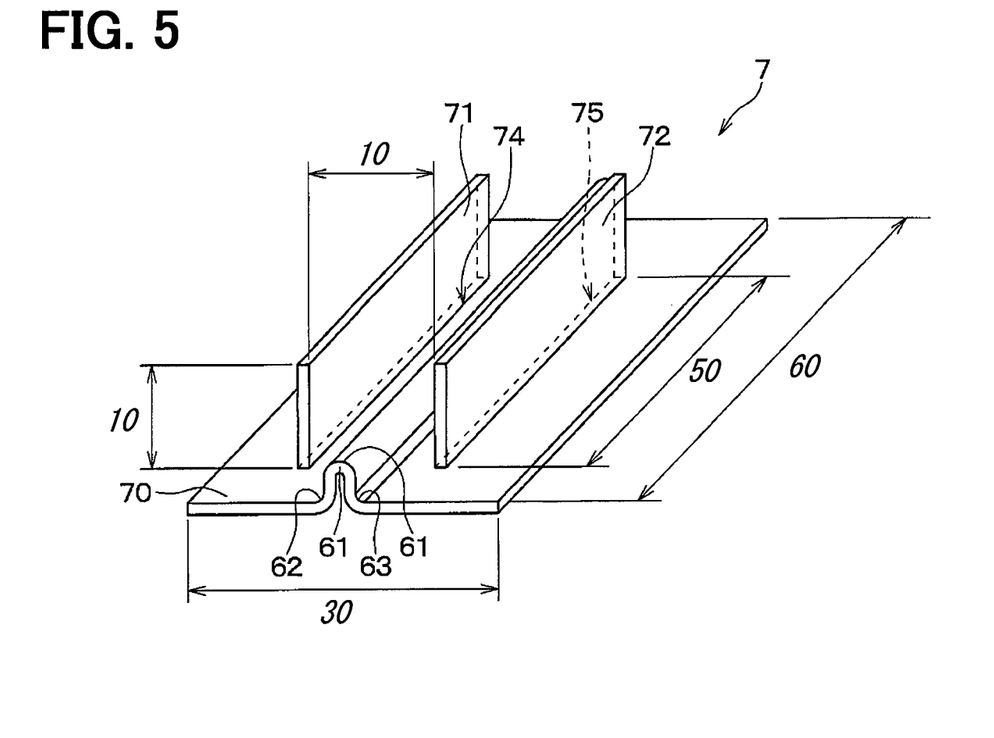
FIG. 5 is a perspective view of a test piece used in an experiment concerning flow reduction of a brazing material.
Figure 6:
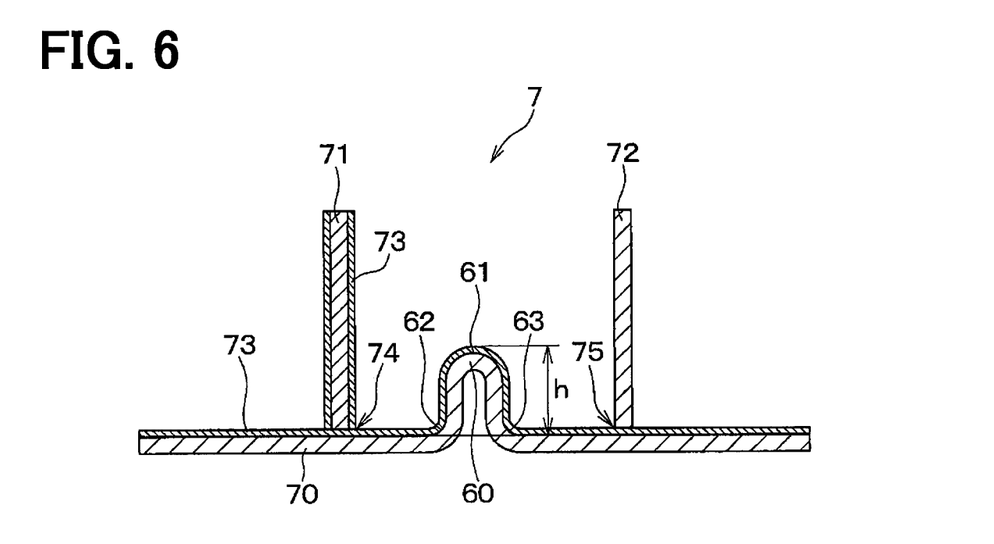
FIG. 6 is a cross-sectional view of the test piece used in the experiment concerning flow reduction of the brazing material.

This experiment was performed using a test piece 7 shown in FIGS. 5 and 6. The test piece 7 was constituted by a horizontal plate 70 having a width of 30 mm and a depth of 60 mm, a first vertical plate 71 having a height of 10 mm and a depth of 50 mm, and a second vertical plate 72 having a height of 10 mm and a depth of 50 mm. Each of the horizontal plate 70 and the first vertical plate 71 was produced from a brazing sheet which includes a base material made of aluminum, and a brazing material 73 joined to a surface of the base material by pressure joining. The second vertical plate 72 was produced from a what is called bear material made of aluminum to which no brazing material is joined by pressure joining. The hilling portion 60 curved in a plate thickness direction is provided on the horizontal plate 70 between the first vertical plate 71 and the second vertical plate 72. The first vertical plate 71 and the second vertical plate 72 are vertically erected on the horizontal plate 70 with a clearance of 10 mm left between the first vertical plate 71 and the second vertical plate 72. It is assumed that the test piece 7 used in the experiment is applied to the heat exchanger 1 which includes the header tank 10 having an inner diameter ranging from 5 mm to 100 mm, for example. In this case, the horizontal plate 70 corresponds to the header tank 10 of the heat exchanger 1 of the first embodiment. A connection portion 74 between the horizontal plate 70 and the first vertical plate 71 corresponds to the first connection portion 17 of the heat exchanger 1 of the first embodiment. The connection portion 75 between the horizontal plate 70 and the second vertical plate 72 corresponds to the second connection portion 19 of the heat exchanger 1 of the first embodiment.

The test piece 7 used in the experiment is classified into at least following ten types. More specifically, the test piece 7 used in the experiment at least includes the hilling portion 60 having the height h of 1 mm, 2 mm, or 5 mm, and a radius of curvature of 0.2 mm, 0.5 mm, or 1.5 mm for each height. The test piece 7 not including the hilling portion 60 on the horizontal plate 70 was further used for comparison. When the test piece 7 of these types is placed and heated in a heating furnace, the heated and melted brazing material 73 is expected to shift on a surface of the horizontal plate 70 from the first vertical plate 71 to the second vertical plate 72.

Figure 7:
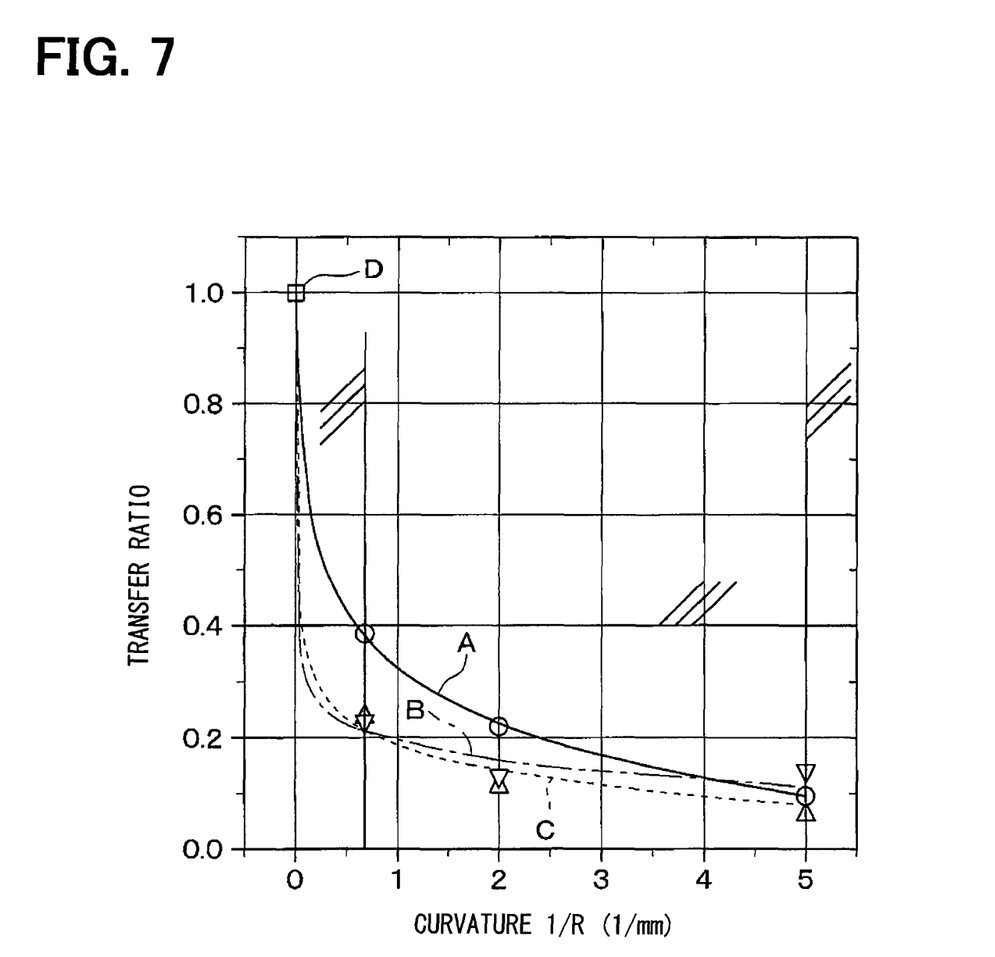
FIG. 7 is a graph showing a result of the experiment concerning flow reduction of the brazing material.

A graph in FIG. 7 shows a plotted result of the experiment performed for the test piece 7 of the ten types. In this graph, a horizontal axis represents curvature of the connection portion 61 of the hilling portion 60, while a vertical axis represents a transfer ratio of the brazing material shifting on the surface of the horizontal plate 70 from the first vertical plate 71 to the second vertical plate 72. The transfer ratio of the brazing material refers to a ratio of a flow amount of the brazing material of the test piece 7 of the respective types to a flow amount of the brazing material of the test piece 7 not including the hilling portion 60 on the horizontal plate 70. In the graph of FIG. 7, the transfer ratio of the brazing material of the test piece 7 not including the hilling portion 60 on the horizontal plate 70 is set to 1 and indicated by a quadrangle with a symbol D.

A change of the transfer ratio of the test piece 7 including the hilling portion 60 having the height h of 1 mm is indicated by a solid line A. Concerning the test piece 7 having this configuration, the transfer ratio for a curvature of 1/1.5 (1/mm) (i.e., radius of curvature of 1.5 mm) is slightly smaller than 0.4. The transfer ratio for a curvature of 2 (1/mm) (i.e., radius of curvature of 0.5 mm) is slightly larger than 0.2. The transfer ratio for a curvature of 5 (1/mm) (i.e., radius of curvature of 0.2 mm) is approximately 0.1.

A change of the transfer ratio of the test piece 7 including the hilling portion 60 having the height h of 2 mm is indicated by an alternate long and short dash line B. Concerning the test piece 7 having this configuration, the transfer ratio for a curvature of 1/1.5 (1/mm) is slightly larger than 0.2. The transfer ratio for a curvature of 2 (1/mm) lies between 0.1 and 0.2. The transfer ratio for a curvature of 5 (1/mm) is slightly larger than 0.1.

A change of the transfer ratio of the test piece 7 which includes the hilling portion 60 having the height h of 5 mm is indicated by a broken line C. Concerning the test piece 7 having this configuration, the transfer ratio for a curvature of 1/1.5 (1/mm) is slightly larger than 0.2. The transfer ratio for a curvature of 2 (1/mm) lies between 0.1 and 0.2. The transfer ratio for a curvature of 5 (1/mm) is slightly smaller than 0.1.

The foregoing results of the experiment show that the effect of reduction of the brazing material flow dramatically improves when the curvature of the connection portion 61 of the hilling portion 60 is set to 1/1.5 (1/mm) or larger (i.e., radius of curvature of 1.5 mm or smaller). According to the experiment, the transfer ratio of the brazing material with the curvature of the connection portion 61 of the hilling portion 60 set to 1/1.5 (1/mm) or larger became equal to or smaller than 40% of the transfer ratio of the brazing material on the horizontal plate 70 not including the hilling portion 60. It has been therefore found that a sufficient reduction effect is produced from the heat exchanger 1 in an actual situation.

On the other hand, even when the curvature of the connection portion 61 of the hilling portion 60 exceeds 5 (i.e., radius of curvature decreases from 0.2 mm), the effect of reduction of the brazing material flow remains substantially constant. Accordingly, the curvature of the connection portion 61 may be set to 5 or smaller to reduce the number of processing steps of the hilling portion 60.

Moreover, the foregoing results of the experiment show that a sufficient effect of reduction of the brazing material flow is produced when the height h of the hilling portion 60 is set to 1 mm or larger. On the other hand, even when the radius of curvature of the connection portion 61 of the hilling portion 60 exceeds 5 mm, the effect of reduction of the brazing material flow remains substantially constant. Accordingly, the radius of curvature may be set to 5 mm or smaller to reduce a pressure loss of the fluid flowing in the flow path.

Figure 8:
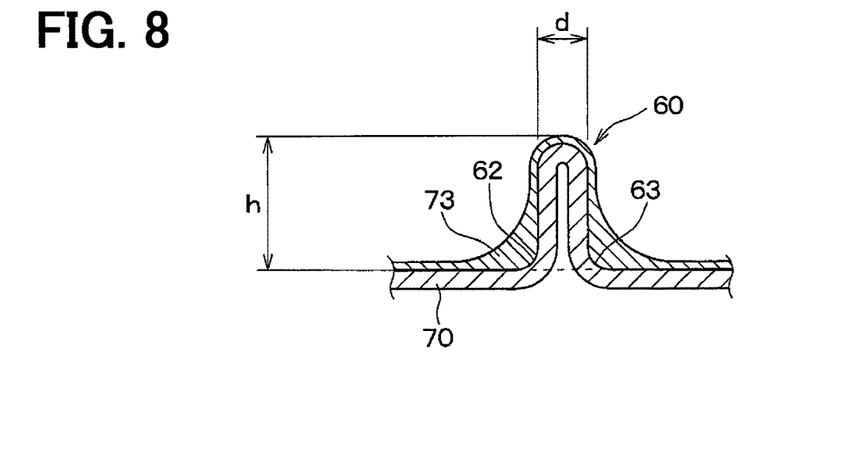
FIG. 8 is a partially enlarged view of a first test piece.
Figure 9:
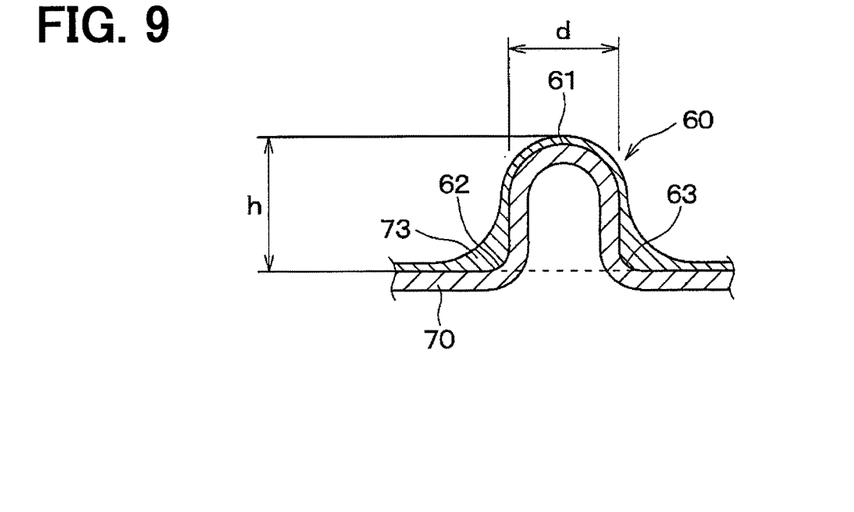
FIG. 9 is a partially enlarged view of a second test piece.
Figure 10:
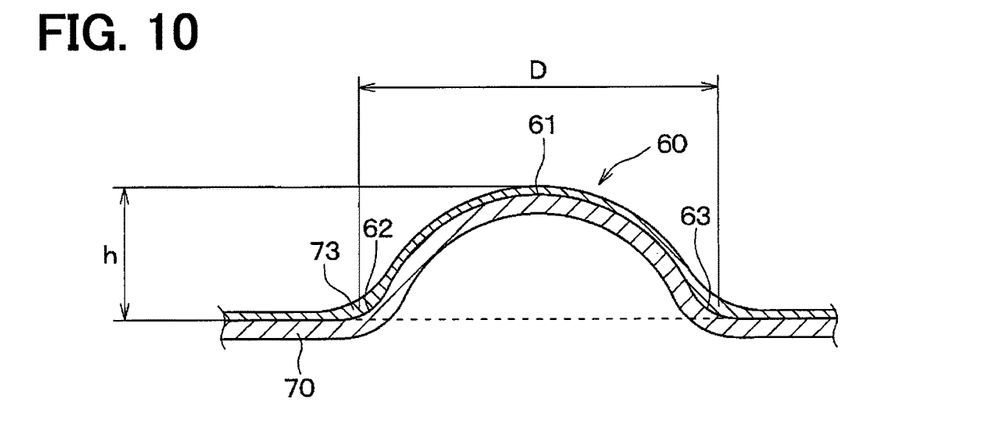
FIG. 10 is a partially enlarged view of a third test piece.

Each of FIGS. 8 to 10 shows a state of the brazing material on the surface of the hilling portion 60 of the test piece 7 of various types each including the hilling portion 60 having the height h of 1 mm, and the connection portion 61 having different diameters d, after brazing in the heating furnace. The diameter d of the hilling portion 60 of the test piece 7 in FIG. 8 is 0.4 mm. The diameter d of the hilling portion 60 of the test piece 7 in FIG. 9 is 1.0 mm. The diameter d of the hilling portion 60 of the test piece 7 in FIG. 10 is 3.0 mm. Accordingly, the radius of curvature of the hilling portion 60 of the test piece 7 in FIG. 8 is 0.2 mm. The radius of curvature of the hilling portion 60 of the test piece 7 in FIG. 9 is 0.5 mm. The radius of curvature of the hilling portion 60 of the test piece 7 in FIG. 10 is 1.5 mm. It has been observed from FIGS. 8 to 10 that substantially none of the brazing material 73 is present near the top of the hilling portion 60 in any type of the test piece 7. More specifically, pressure of the heated and melted brazing material in the vicinity of the top of the hilling portion 60 is higher than pressure of the brazing material around the top. Accordingly, the flow of the brazing material can be reduced by the hilling portion 60.

The heat exchanger 1 of the first embodiment described above can achieve following operational advantages.

(1) According to the first embodiment, the hilling portion 60 is provided on the header member 15 corresponding to the predetermined flow path member between the first connection portion 17 and the second connection portion 19. The hilling portion 60 is a portion included in the header member 15 and having a shape curved to protrude toward the side where the brazing material is provided, and extends in the extension direction of the first connection portion 17.

According to this configuration, the brazing material is melted into a liquid film shape on the surfaces of the respective flow path members during brazing of the flow path members of the heat exchanger 1. In this case, pressure of the brazing material on the top of the hilling portion 60 becomes higher than pressure of the brazing material around the top of the hilling portion 60 during brazing. In this case, flow resistance of the brazing material flowing across the hilling portion 60 on the surface of the header member 15 increases. Accordingly, a flow of the brazing material from the first connection portion 17 which is a connection portion between the header member 15 and the tank member 14 toward the second connection portion 19 which is a connection portion between the header member 15 and the tube 20 across the hilling portion 60 is reduced during brazing. The heat exchanger 1 therefore can prevent shortage of connection portion strength caused by reduction of the fillet of the first connection portion 17, and further prevent an excess of the brazing material on the second connection portion 19. The heat exchanger 1 can also prevent suction of the brazing material from the inside of the header tank 10 into the tube 20, thereby preventing closure of the flow path inside the tube 20 by the sucked brazing material during brazing.

(2) According to the first embodiment, the hilling portion 60 includes the connection portion 61 formed on the top of the hilling portion 60, and the first concave 62 and the second concave 63 formed in the base of the hilling portion 60.

According to this configuration, pressure of the heated and melted brazing material at the connection portion 61 becomes higher than pressure of the brazing material at the first concave 62 and the second concave 63 during brazing. In this case, the brazing material on the connection portion 61 easily flows toward the first concave 62 and the second concave 63. Accordingly, a flow of the brazing material along the surface of the header member 15 across the hilling portion 60 can be reduced during brazing.

(3) According to the first embodiment, a radius of curvature of the connection portion 61 of the hilling portion 60 preferably ranges from 0.2 mm to 1.5 mm inclusive in a cross section perpendicular to the extension direction of the hilling portion 60.

According to this configuration, the effect of reduction of the brazing material flow with the radius of curvature of the connection portion 61 of the hilling portion 60 set to 1.5 mm or smaller improves more dramatically than an effect produced with the radius of curvature exceeding 1.5 mm. On the other hand, even when the radius of curvature of the connection portion 61 of the hilling portion 60 is smaller than 0.2 mm, the effect of reduction of the brazing material flow remains substantially constant. Accordingly, the radius of curvature may be set to 0.2 mm or larger to reduce the number of processing steps.

(4) According to the first embodiment, the height from the base to the top of the hilling portion 60 preferably ranges from 1 mm to 5 mm inclusive.

According to this configuration, a sufficient effect of reduction of the brazing material flow can be produced when the height of the hilling portion 60 is set to 1 mm or larger. On the other hand, even when the radius of curvature of the connection portion 61 of the hilling portion 60 exceeds 5 mm, the effect of reduction of the brazing material flow remains substantially constant. Accordingly, the radius of curvature may be set to 5 mm or smaller to reduce a pressure loss of the refrigerant flowing in the flow path within the header tank 10.

Second Embodiment

A second embodiment will be now described. The second embodiment is similar to the first embodiment except for the configuration of the hilling portion 60 modified from the corresponding configuration of the first embodiment. Accordingly, only parts different from the corresponding parts of the first embodiment are herein described.

Figure 11:
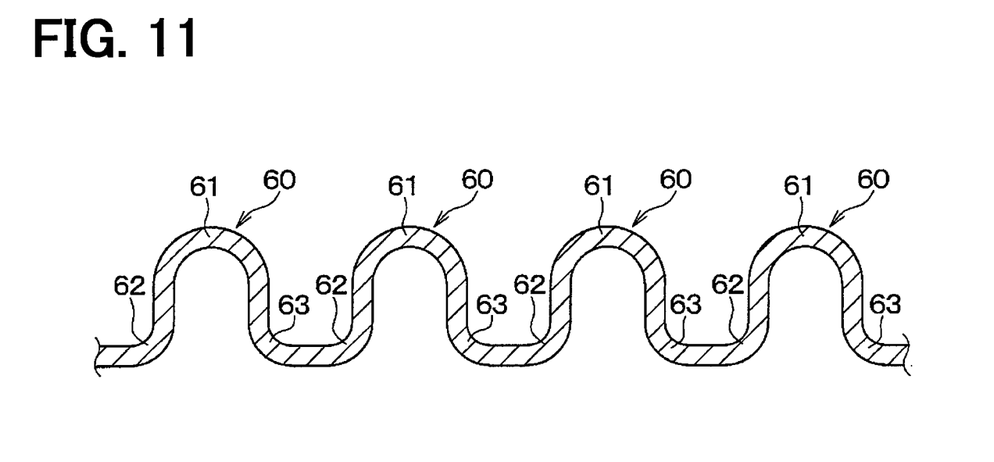
FIG. 11 is an enlarged cross-sectional view of hilling portions of a heat exchanger according to a second embodiment.

According to the second embodiment, a plurality of the hilling portions 60 are provided on a predetermined flow path member included in the heat exchanger 1 and constituting a flow path through which fluid flows as shown in FIG. 11. While not shown in the figure, the first connection portion 17 which joins the predetermined flow path member and the other flow path member by brazing is disposed on the predetermined flow path member on one side in a plane direction (i.e., one of the right side and the left side in the figure). Moreover, the second connection portion 19 which joins the predetermined flow path member and the other flow path member by brazing is disposed on the predetermined flow path member on the other side in the plane direction (i.e., the other of the right side and the left side in the figure). According to the second embodiment, therefore, the plurality of hilling portions 60 are provided on the predetermined flow path member between the first connection portion 17 and the second connection portion 19. The plurality of hilling portions 60 extend in the extension direction of the first connection portion 17 or the second connection portion 19.

It is preferable that a radius of curvature of the connection portion 61 of each of the plurality of hilling portions 60 range from 0.2 mm to 1.5 mm inclusive in a cross section perpendicular to the extension direction of the hilling portions 60. It is further preferable that a height of each of the plurality of hilling portions 60 from the base to the top of the hilling portion 60 range from 1 mm to 5 mm inclusive. The plurality of hilling portions 60 may be configured such that at least one of the plurality of hilling portions 60 has a radius of curvature in the range from 0.2 mm to 1.5 mm inclusive, and that at least one of the plurality of hilling portions 60 has a height from the base to the top in the range from 1 mm to 5 mm inclusive.

According to the second embodiment described above, the plurality of hilling portions 60 are provided on the predetermined flow path member. In this case, flow resistance of the brazing material flowing across the the plurality of hilling portions 60 on the surface of the flow path member can further increase during brazing. Accordingly, a flow of the brazing material across the plurality of hilling portions 60 on the surface of the flow path member can be securely reduced.

Third Embodiment

A third embodiment will be now described. The third embodiment is also similar to the first embodiment except for the configuration of the hilling portion 60 modified from the corresponding configuration of the first embodiment. Accordingly, only parts different from the corresponding parts of the first embodiment are herein described.

Figure 12:
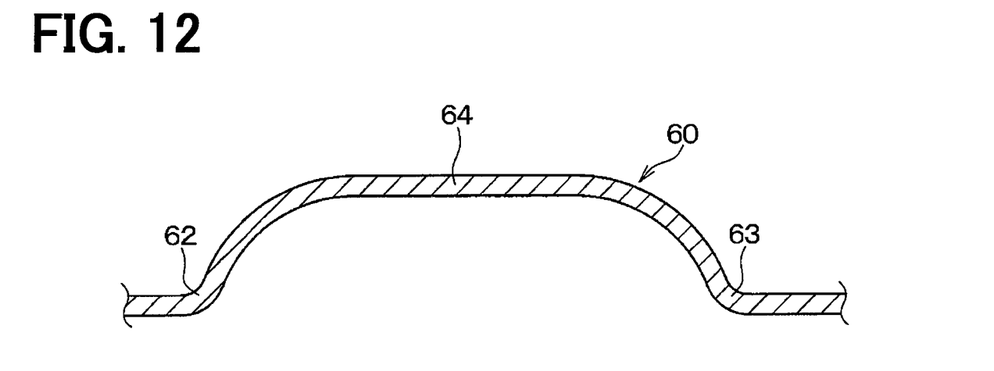
FIG. 12 is an enlarged cross-sectional view of a hilling portion of a heat exchanger according to a third embodiment.

According to the third embodiment, the hilling portion 60 is similarly provided on a predetermined flow path member included in the heat exchanger 1 and constituting a flow path through which fluid flows as shown in FIG. 12. While not shown in the figure, the first connection portion 17 is disposed on the predetermined flow path member on one side in the plane direction. The second connection portion 19 is disposed on the predetermined flow path member on the other side in the plane direction. The hilling portion 60 extends in the extension direction of the first connection portion 17 or the second connection portion 19.

According to the third embodiment, the hilling portion 60 has a flat portion 64 at a center of the connection portion 61. The size of the flat portion 64 may be appropriately determined by an experiment or other methods. The third embodiment described above also achieves operational advantages similar to the operational advantages of the first and second embodiments described above.

Fourth Embodiment

A fourth embodiment will be now described. The heat exchanger 1 of the fourth embodiment has a configuration modified from the corresponding configuration of the first embodiment.

Figure 13:
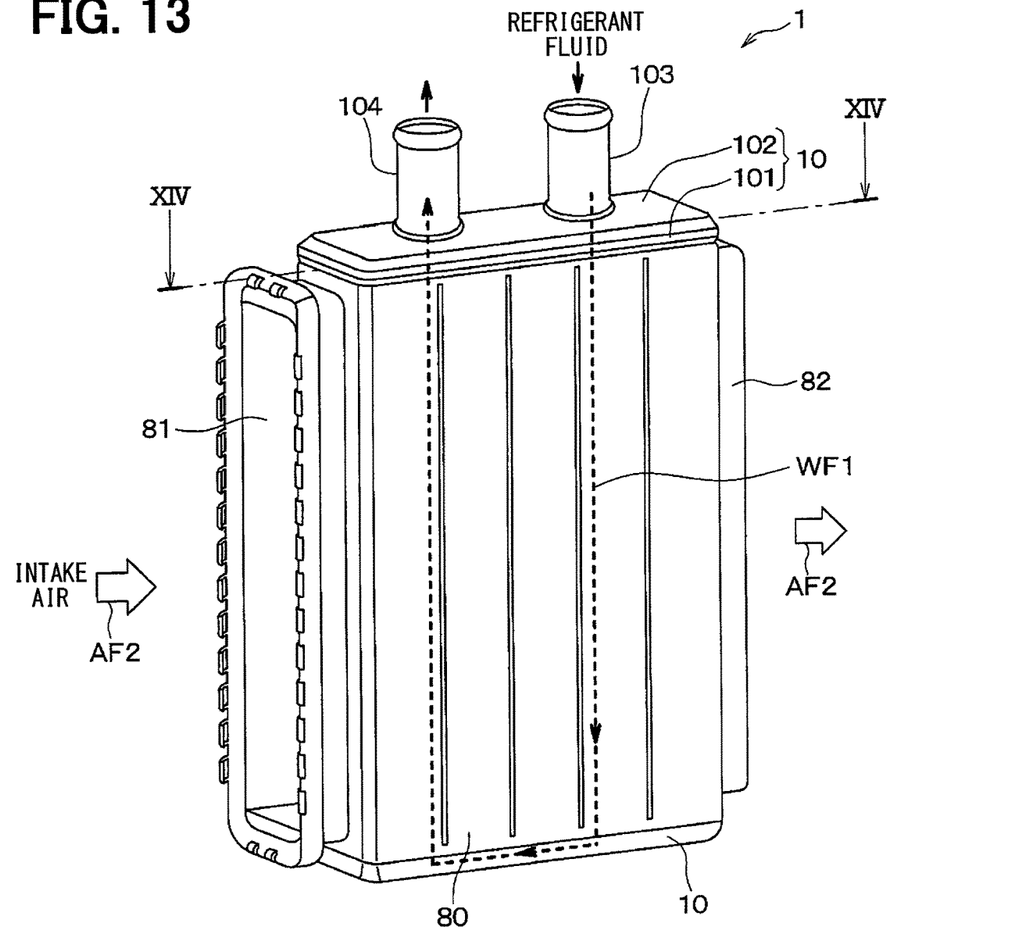
FIG. 13 is a perspective view of a heat exchanger according to a fourth embodiment.
Figure 14:
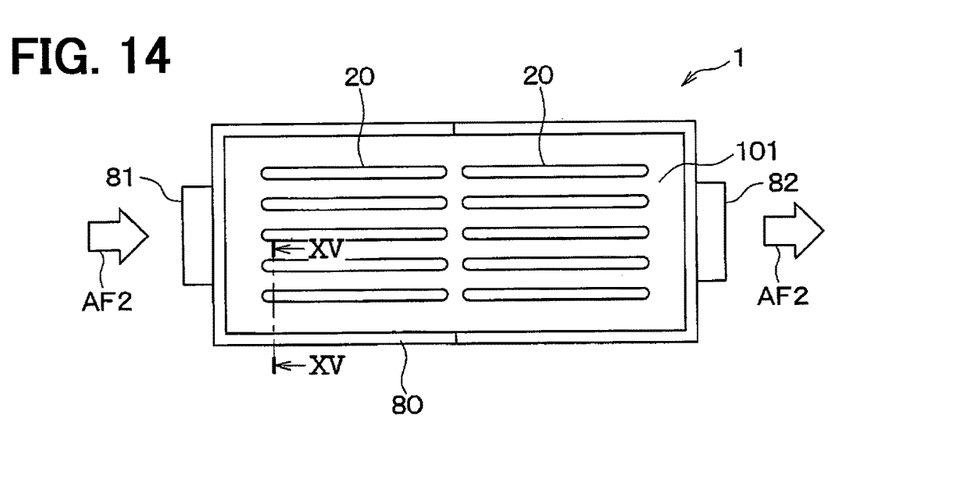
FIG. 14 is a cross-sectional view taken along a line XIV-XIV in FIG. 13.
Figure 15:
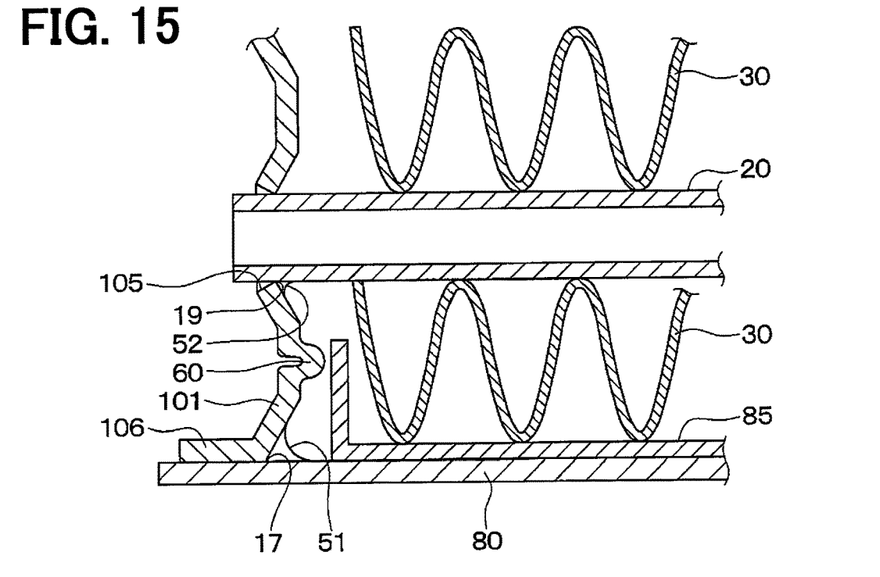
FIG. 15 is a cross-sectional view taken along a line XV-XV in FIG. 14.

As shown in FIGS. 13 to 15, the heat exchanger 1 of the fourth embodiment is an intercooler mounted on a vehicle which includes a not-shown supercharger. The heat exchanger 1 achieves heat exchange between intake air compressed by the supercharger and cooling water.

The heat exchanger 1 includes the two header tanks 10, the plurality of tubes 20 communicatively connecting the two header tanks 10, the outer fins 30 provided on the outside of the plurality of tubes 20, and a duct plate 80 covering the outside of the plurality of tubes 20, and others. All these members are flow path members forming a flow path through which fluid flows. For example, these members are produced from a brazing sheet which includes a base material made of aluminum, and a brazing material joined to a surface of the base material by pressure joining in a manufacturing process.

The two header tanks 10 are disposed in parallel to and away from each other. Each of the header tanks 10 has a flat square column shape formed by combining openings of a core plate 101 having a square plate shape and of a tank body 102 having a square plate shape.

The tank body 102 constituting one of the header tanks 10 includes an inlet pipe 103 to which cooling water is supplied, and an outlet pipe 104 from which cooling water flows out. A not-shown separator is provided inside the one header tank 10 to divide an internal space into an inlet chamber and an outlet chamber.

As indicated by a broken line with arrows WF1 in FIG. 13, cooling water having flowed from the inlet pipe 103 into the inlet chamber of the one header tank 10 flows through the plurality of tubes 20 and the other header tank 10, and then flows out from the outlet chamber of the one header tank 10 through the outlet pipe 104.

FIG. 14 shows the heat exchanger 1 as viewed from the core plate 101 constituting the one header tank 10 in a state that the tank body 102 constituting the one header tank 10 is removed. FIG. 15 is a cross-sectional view taken along a line XV-XV in FIG. 14. As shown in FIG. 15, the plurality of tubes 20 are inserted into holes 105 formed in the core plate 101 of the header tank 10, and joined to the core plate 101 by brazing.

The duct plate 80 is formed into each columnar shape, and so provided as to cover the outside of the plurality of tubes 20. As shown in FIG. 13 and FIG. 14, an intake air inlet 81 into which intake air flows is formed in the duct plate 80 on one side in a direction crossing a facing direction of the two header tanks 10, while an intake air outlet 82 is formed in the duct plate 80 on the other side. As indicated by an arrow AF2 in FIGS. 13 and 14, intake air flowing from the intake air inlet 81 to the inside of the duct exchanges heat with cooling water flowing inside the tube 20 in the duct, and then flows from the intake air outlet 82 toward a not-shown engine.

As shown in FIG. 15, an end of the duct plate 80 is joined by brazing to a flange 106 provided at an outer edge of the core plate 101. In the fourth embodiment, a connection portion between the flange 106 of the core plate 101 and the duct plate 80 is referred to as the first connection portion 17.

As described above, the plurality of tubes 20 are inserted into holes 105 formed in the core plate 101 of the header tank 10, and joined to the core plate 101 by brazing. According to the fourth embodiment, each of connection portions between the core plate 101 and the tubes 20 is referred to as the second connection portion 19.

The outer fins 30 are further provided between the plurality of tubes 20. A reinforcing plate 85 is provided between the duct plate 80 and the outer fins 30. The outer fins 30 are fixed to the outer walls of the tubes 20 and the reinforcing plate 85 by brazing.

The flow path members constituting the heat exchanger 1 are fixed to each other by brazing. Accordingly, a not-shown brazing material layer is provided on surfaces of the respective flow path members also in the fourth embodiment, similarly to the first embodiment. FIG. 15 shows only fillets 51 and 52 of the brazing material of the brazing material layer on the first connection portion 17 and the second connection portion 19.

According to the fourth embodiment, the hilling portion 60 is provided on the core plate 101 of the header tank 10. The hilling portion 60 is a portion included in the core plate 101 and located between the first connection portion 17 and the second connection portion 19, and curved to protrude toward the side where the brazing material is provided. The hilling portion 60 extends in the extension direction of the first connection portion 17 and the second connection portion 19 (i.e., direction perpendicular to sheet surface of FIG. 15). According to the fourth embodiment, the core plate 101 including the hilling portion 60 is an example of "the predetermined flow path member" described in one aspect and others of the present disclosure. Each of the duct plate 80 and the tubes 20 is an example of "the other flow path member" described in the one aspect and others of the present disclosure.

According to the fourth embodiment, the hilling portion 60 provided on the core plate 101 reduces a flow of the brazing material, which has been heated and melted into a liquid film shape, along the surface of the core plate 101 from the first connection portion 17 to the second connection portion 19 during brazing of the heat exchanger 1 in a heating furnace. The heat exchanger 1 therefore prevents shortage of connection portion strength caused by reduction of the fillet of the first connection portion 17, and further prevents an excess of the brazing material on the second connection portion 19.

Fifth Embodiment

A fifth embodiment will be now described. The heat exchanger 1 of the fifth embodiment also has a configuration modified from the corresponding configuration of the first embodiment.

Figure 16:
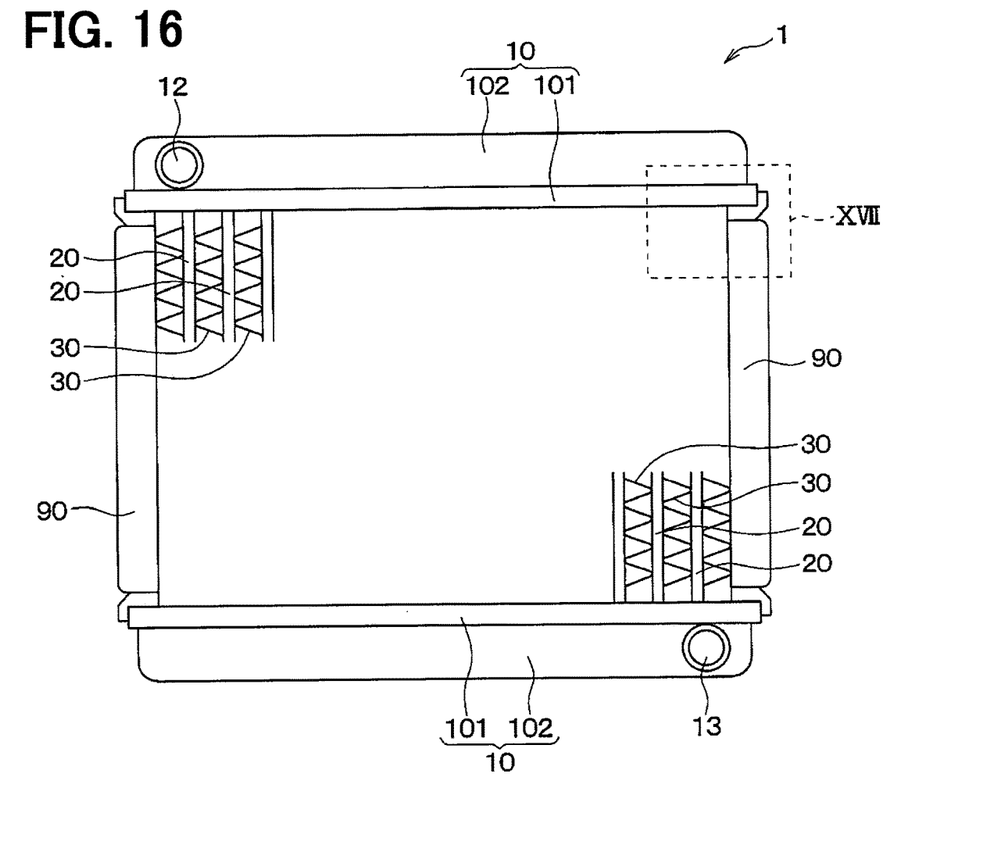
FIG. 16 is a front view of a heat exchanger according to a fifth embodiment.
Figure 17:
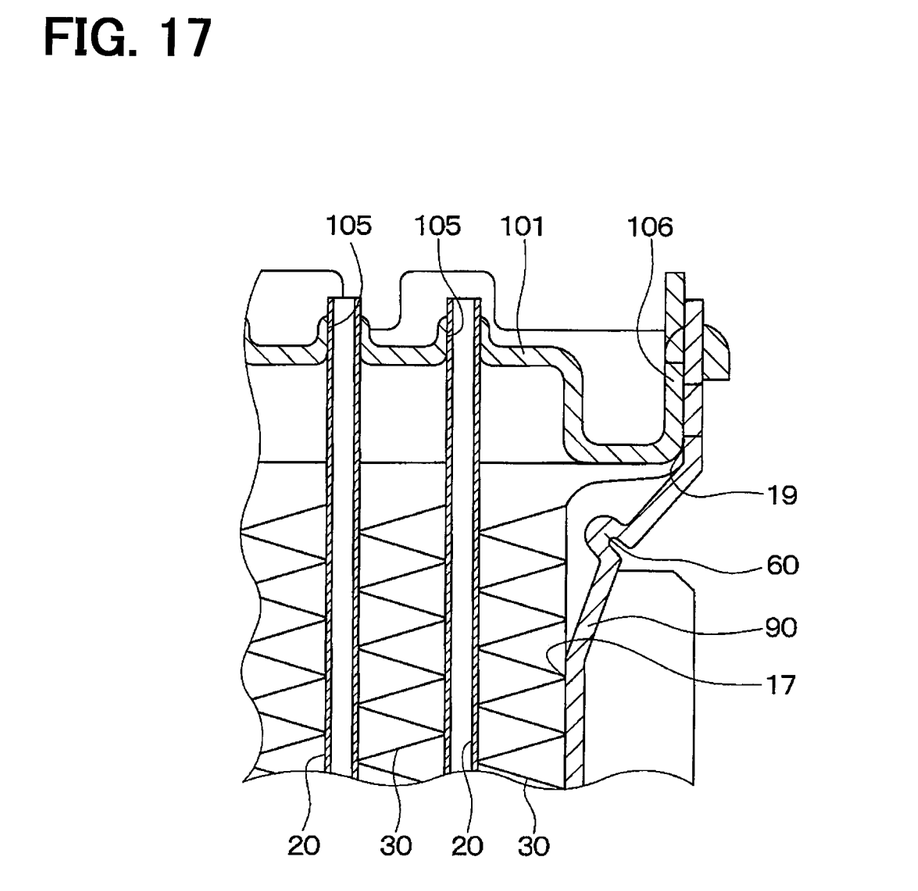
FIG. 17 is a cross-sectional view of a portion XVII in FIG. 16.

As shown to FIG. 16 and FIG. 17, the heat exchanger 1 of the fifth embodiment is a radiator which achieves heat exchange between engine cooling water and outside air.

The heat exchanger 1 includes the two header tanks 10, the plurality of tubes 20 communicatively connecting the two header tanks 10, the outer fins 30 provided on the outside of the plurality of tubes 20, and side plates 90 provided on the outside of the outer fins 30, and others. All these members are flow path members forming a flow path through which fluid flows. For example, these members are produced from a brazing sheet which includes a base material made of aluminum, and a brazing material joined to a surface of the base material by pressure joining in a manufacturing process.

The two header tanks 10 are disposed in parallel to and away from each other. Each of the header tanks 10 is constituted by a combination of openings of the core plate 101 having a plate shape, and of the tank body 102 having a bowl shape.

One of the header tanks 10 includes the inlet 12 to which cooling water is supplied, while the other header tank 10 includes the outlet 13 from which cooling water flows out. Cooling water having flowed from the inlet 12 into the one header tank 10 flows through the plurality of tubes 20 and the other header tank 10, and then flows out from the outlet 13 of the other header tank 10.

FIG. 17 is a cross-sectional view of a state in a portion XVII in FIG. 16 after removal of the tank body 102. As shown in FIG. 17, the plurality of tubes 20 are inserted into the holes 105 formed in the core plate 101 of the header tank 10, and joined to the core plate 101 by brazing.

The outer fins 30 are provided between the plurality of tubes 20. The outer fins 30 included in the plurality of outer fins 30 and located on outer sides are fixed to the side plate 90 by brazing. According to the fifth embodiment, each of connection portions between the side plate 90 and the outer fins 30 is referred to as the first connection portion 17.

The side plate 90 is fixed to the flange 106 provided at an outer edge of the core plate 101 by brazing. In the fifth embodiment, the connection portion between the flange 106 of the core plate 101 and the side plate 90 is referred to as the second connection portion 19.

Respective members constituting the heat exchanger 1 are fixed to each other by brazing. Accordingly, a not-shown brazing material layer is provided on surfaces of the respective members in the fifth embodiment similarly to the first embodiment.

According to the fifth embodiment, the hilling portion 60 is provided on the side plate 90. The hilling portion 60 is a portion included in the side plate 90 between the first connection portion 17 and the second connection portion 19, and curved to protrude toward the outside air flow path where the brazing material is provided. The hilling portion 60 extends in the extension direction of the first connection portion 17 and the second connection portion 19 (i.e., direction perpendicular to sheet surface of FIG. 17). According to the fifth embodiment, the side plate 90 including the hilling portion 60 is an example of "the predetermined flow path member" described in one aspect and others of the present disclosure. Each of the outer fins 30 and the core plate 101 is an example of "the other flow path member" described in the one aspect and others of the present disclosure.

According to the fifth embodiment, the hilling portion 60 provided on the side plate 90 reduces a flow of the heated and melted brazing material on the surface of the side plate 90 from the first connection portion 17 to the second connection portion 19 during brazing of the heat exchanger 1 in a heating furnace. The heat exchanger 1 therefore prevents shortage of connection portion strength caused by reduction of the fillet of the first connection portion 17, and further prevents an excess of the brazing material on the second connection portion 19.

Other Embodiments

The present disclosure is not limited to the embodiments described above, but may be modified appropriately. The respective embodiments described herein are not embodiments unrelated to each other, and therefore can be appropriately combined unless such combinations are obviously inappropriate. According to the respective embodiments described above, needless to say, elements constituting the respective embodiments are not necessarily essential unless clearly expressed as particularly essential, or considered as obviously essential in principle, for example. According to the respective embodiments described above, values such as numbers of the constituent elements, numerical values, quantities, and ranges described in the embodiments are not limited to specific values unless clearly expressed as particularly essential, or considered as obviously limited to the specific values in principle, for example. According to the respective embodiments described above, shapes, positional relationships, or others of the constituent elements and the like described in the embodiments are not limited to specific shapes, positional relationships, or others unless clearly expressed, or limited to the specific shapes, positional relationships, or others in principle.

(1) According to the embodiments described above, the hilling portion 60 is provided on the header member 15, the core plate 101, or the side plate 90 constituting the heat exchanger 1. According to a different embodiment, however, the hilling portion 60 may be provided on various flow path members constituting the heat exchanger 1.

(2) According to the embodiments described above, the hilling portion 60 preferably has a radius of curvature ranging from 0.2 mm to 1.5 mm inclusive, and preferably has a height ranging from 1 mm to 5 mm inclusive. According to a different embodiment, however, the radius of curvature and height of the hilling portion 60 may be appropriately determined in accordance with the size of the heat exchanger 1, or the nature and amount of the brazing material.

(Summary)

According to a first aspect shown in a part or all of the respective embodiments described above, a heat exchanger includes flow path members, a first connection portion, a second connection portion, a brazing material layer, and a hilling portion. The flow path members form a flow path through which fluid flows. The first connection portion is a portion disposed on a predetermined flow path member of the flow path members on one side of the predetermined flow path member in a plane direction, and joining the predetermined flow path member and the other flow path member by brazing. The second connection portion is a portion disposed on the predetermined flow path member on the other side of the predetermined flow path member in the plane direction, and joining the predetermined flow path member and the other flow path member by brazing. The brazing material layer extends over the predetermined flow path member, the first connection portion, and the second connection portion. The hilling portion is a portion included in the predetermined flow path member, located between the first connection portion and the second connection portion, and curved to protrude toward a side where the brazing material is provided, and extends in an extension direction of the first connection portion or the second connection portion.

According to a second aspect, the hilling portion includes a connection portion, a first concave, and a second concave. The connection portion is formed on a top of the hilling portion. The first concave is formed in a base of the hilling portion near the first connection portion. The second concave is formed in a base of the hilling portion near the second connection portion.

According to this aspect, pressure of the heated and melted brazing material at the connection portion becomes higher than pressure of the brazing material at the first concave and the second concave during brazing. In this case, the brazing material on the connection portion easily flows toward the first concave and the second concave. Accordingly, a flow of the brazing material along the surface of the flow path member across the hilling portion can be reduced during brazing.

According to a third aspect, a radius of curvature of the connection portion of the hilling portion ranges from 0.2 mm to 1.5 mm inclusive in a cross section perpendicular to the extension direction of the hilling portion.

According to this aspect, the effect of reduction of the brazing material flow with the radius of curvature of the connection portion of the hilling portion set to 1.5 mm or smaller improves more dramatically than an effect produced with the radius of curvature exceeding 1.5 mm. On the other hand, even when the radius of curvature of the connection portion of the hilling portion is smaller than 0.2 mm, the effect of reduction of the brazing material flow remains substantially constant. Accordingly, the radius of curvature may be set to 0.2 mm or larger to reduce the number of processing steps.

According to a fourth aspect, a height of the hilling portion from the base to the top of the hilling portion ranges from 1 mm to 5 mm inclusive.

According to this aspect, a sufficient effect of reduction of the brazing material flow can be produced when the height of the hilling portion is set to 1 mm or larger. On the other hand, even when the height of the connection portion of the hilling portion exceeds 5 mm, the effect of reduction of the brazing material flow remains substantially constant. Accordingly, the height may be set to 5 mm or smaller to reduce a pressure loss of the fluid flowing in the flow path.

The height of the hilling portion from the base to the top is a distance between a common tangent line of an interface between the brazing material layer and the base material at the first concave and an interface between the brazing material layer and the base material at the second concave, and a line extending in parallel to the common tangent line and coming into contact with an outer surface of the brazing material layer of the connection portion in a cross-sectional view of the hilling portion.

According to a fifth aspect, a plurality of hilling portions are provided between the first connection portion and the second connection portion.

According to this aspect, flow resistance of the brazing material flowing across the the plurality of hilling portions on the surface of the flow path member further increases during brazing.

According to a sixth aspect, each of the plurality of hilling portions includes the connection portion that has a radius of curvature ranging from 0.2 mm to 1.5 mm inclusive in a cross section perpendicular to an extension direction of the hilling portion, and a height of each of the plurality of hilling portions from the base to the top of the hilling portion ranges from 1 mm to 5 mm inclusive.

According to this aspect, a flow of the brazing material across the plurality of hilling portions on the surface of the flow path member can be securely reduced.

According to a seventh aspect, the heat exchanger includes a plurality of header tanks and a plurality of tubes. Each of the plurality of header tanks is constituted by a header member and a tank member. Fluid is supplied to or discharged from the header tanks. The plurality of tubes are inserted into holes formed in the header member, and fixed to the holes. The plurality of tubes communicatively connect one and the other of the plurality of header tanks. According to the heat exchanger of this aspect, the predetermined flow path member including the hilling portion corresponds to the header member. The first connection portion is a connection portion between the tank member and the header member. The second connection portion is each of connection portions between the holes of the header member and the tubes.

According to this aspect, the hilling portion is a portion included in the header member, and curved to protrude to the side where the brazing material is provided, and extends in the extension direction of the connection portion between the tank member and the header member. In this case, the hilling portion reduces a flow of the brazing material from the connection portion between the tank member and the header member toward the connection portions between the holes of the header member and the tubes during brazing. Accordingly, the heat exchanger of this aspect can prevent shortage of connection portion strength of the connection portion between the tank member and the header member, and also prevent an excess of the brazing material on the connection portions between the holes of the header member and the tubes.

According to an eighth aspect, the heat exchanger includes a plurality of header tanks, a plurality of tubes, and a duct plate. Each of the plurality of header tanks is constituted by a core plate and a tank body. The fluid is supplied to or discharged from the header tanks. The plurality of tubes are inserted into holes formed in the core plate, and fixed to the holes by brazing. The plurality of tubes communicatively connect one and the other of the plurality of header tanks. The duct plate is so provided as to cover the outside of the plurality of tubes, and is joined to the core plate by brazing. According to the heat exchanger of this aspect, the predetermined flow path member including the hilling portion corresponds to the core plate. The first connection portion is a connection portion between the core plate and the duct plate. The second connection portion is each of connection portions between the holes of the core plate and the tubes.

According to this aspect, the hilling portion is a portion included in the core plate, and curved to protrude to the side where the brazing material is provided, and extends in the extension direction of the connection portion between the core plate and the duct plate. In this case, the hilling portion reduces a flow of the brazing material from the connection portion between the core plate and the duct plate toward the connection portions between the holes of the core plate and the tubes during brazing. Accordingly, the heat exchanger of this aspect can prevent shortage of connection portion strength of the connection portion between the core plate and the duct plate, and also prevent an excess of the brazing material on the connection portions between the holes of the core plate and the tubes.

According to a ninth aspect, the heat exchanger includes a plurality of header tanks, a plurality of tubes, fins, and a side plate. Each of the plurality of header tanks is constituted by a core plate and a tank body. The fluid is supplied to or discharged from the header tanks. The plurality of tubes are inserted into holes formed in the core plate, and fixed to the holes by brazing. The plurality of tubes communicatively connect one and the other of the plurality of header tanks. The outer fins are provided outside the plurality of tubes. The side plate is disposed on an outside in an arrangement direction in which the plurality of tubes and the plurality of outer fins are alternately arranged, and joined to the outer fins and the core plate both disposed on the outside in the arrangement direction by brazing. According to the heat exchanger of this aspect, the predetermined flow path member including the hilling portion corresponds to the side plate. The first connection portion is a connection portion between the side plate and each of the outer fins. The second connection portion is a connection portion between the side plate and the core plate.

According to this aspect, the hilling portion is a portion included in the side plate, and curved to protrude to the side where the brazing material is provided, and extends in the extension direction of the connection portion between the side plate and each of the outer fins, or in the extension direction of the connection portion between the side plate and the core plate. In this case, the hilling portion reduces a flow of the brazing material from the connection portion between the side plate and each of the outer fins toward the connection portion between the side plate and the core plate during brazing. Accordingly, the heat exchanger of this aspect can prevent shortage of connection portion strength of the connection portion between the side plate and each of the outer fins, and also prevent an excess of the brazing material on the connection portion between the side plate and the core plate.

What is claimed is:

1. A heat exchanger that performs heat exchange with a fluid, the heat exchanger comprising:
a plurality of flow path members that define a flow path through which the fluid flows;
the plurality of flow path members including a predetermined flow path member, a first flow path member, and at least one second flow path member;
at least one first connection portion at which the predetermined flow path member and the first flow path member are bonded with each other by a brazing material layer, the at least one first connection portion being located on at least one side of the predetermined flow path member along a width of the predetermined flow path member and extending along a length of the predetermined flow path member in a longitudinal direction of the predetermined flow path member;
at least one second connection portion at which the predetermined flow path member and the at least one second flow path member are bonded with each other by the brazing material layer, the at least one second connection portion being located on a surface of the predetermined flow path member along the width of the predetermined flow path member;
the brazing material layer extends over the predetermined flow path member, the first connection portion, and the at least one second connection portion; and
at least one hilling portion that is formed on the predetermined flow path member between the at least one first connection portion and the at least one second connection portion, the at least one hilling portion being curved toward a side on which the brazing material layer is provided, a length of the hilling portion extending the length of the predetermined flow path member, wherein
the at least one hilling portion includes
a protrusion portion that defines a top of the hilling portion, a first concave portion located on one side of the hilling portion, the first concave portion being located between the protrusion portion and the at least one first connection portion, and
a second concave portion located on another side of the at least one hilling portion, the second concave portion being located between the protrusion portion and the second connection portion, where the first and second concave portions define a base of the hilling portion, and
in a cross section of the hilling portion along the length of the predetermined flow path member, a radius of curvature of the protrusion portion of the hilling portion is at or above 0.2 mm, and at or below 1.5 mm.

2. The heat exchanger according to claim 1, wherein a height of the at least one hilling portion from the base to the top is at or above 1 mm, and at or below 5 mm.

3. The heat exchanger according to claim 1, wherein the at least one hilling portions includes two hilling portions and the at least one first connection portion includes two first connection portions, wherein one of the two hilling portions is provided between one of the two first connection portions and the at least one second connection portion, and wherein the other of the two hilling portions is provided between the other of the two first connection portions and the at least one second connection portion.

4. The heat exchanger according to claim 3, wherein a radius of curvature of the protrusion portion of each hilling portion is at or above 0.2 mm, and at or below 1.5 mm in a cross section of each hilling portion along the length of the predetermined flow path member, and a height of each hilling portion between the base to the top is at or above 1 mm, and at or below 5 mm.

5. The heat exchanger according to claim 1, comprising:
a plurality of header tanks, each header tank including a header member defined by the predetermined flow path member and a tank member defined by the first flow path member, the fluid being supplied into the plurality of header tanks and discharged from the plurality of header tanks; and
a plurality of tubes defined by the at least one second flow path member, each of the tubes is inserted into a hole formed on each header member of the plurality of header members and is fixed to each header member, one header tank of the plurality of header tanks and another header tank of the plurality of header tanks communicating with each other through the plurality of tubes, wherein
the at least one first connection portion defines at least one connection between the tank member and the header member, and
the at least one second connection portion defines connections between the hole of the header member and each tube of the plurality of tubes.

* * * * *